United States Patent
Reynolds et al.

[11] Patent Number: 5,964,251
[45] Date of Patent: *Oct. 12, 1999

[54] CHEMICALLY BONDED MULTI-WALL CONDUIT

[75] Inventors: Kim A. Reynolds, Berwyn; Charles P. Marino, Philadelphia, both of Pa.

[73] Assignee: Markel Corporation, Norristown, Pa.

[ * ] Notice: This patent is subject to a terminal disclaimer.

[21] Appl. No.: 08/832,020

[22] Filed: Apr. 2, 1997

Related U.S. Application Data

[63] Continuation of application No. 08/321,220, Oct. 11, 1994, Pat. No. 5,653,266.

[51] Int. Cl.[6] ..................................................... F16L 11/04
[52] U.S. Cl. ........................ 138/137; 138/141; 138/146; 138/DIG. 3; 138/DIG. 7
[58] Field of Search ..................... 138/137, 146, 138/126, 141, 140; 156/244.11; 428/339; 174/107; 361/215

[56] References Cited

U.S. PATENT DOCUMENTS

| | | | |
|---|---|---|---|
| 2,789,063 | 4/1957 | Purvis et al. | 117/47 |
| 2,809,130 | 10/1957 | Rappaport et al. | 117/138.8 |
| 3,471,207 | 10/1969 | McCloskey | 308/72 |
| 3,516,239 | 6/1970 | Fukuda et al. | 57/140 |
| 3,632,287 | 1/1972 | Sutherland | 117/47 |
| 4,258,089 | 3/1981 | Anderson et al. | 427/318 |
| 4,317,879 | 3/1982 | Busby et al. | 435/14 |
| 4,568,598 | 2/1986 | Bilkadi et al. | 428/141 |
| 4,743,327 | 5/1988 | DeHaan et al. | 156/272.6 |
| 4,744,857 | 5/1988 | Nelson | 156/637 |
| 4,933,060 | 6/1990 | Prohaska et al. | 204/192.3 |
| 5,237,049 | 8/1993 | Cavanaugh et al. | 528/491 |
| 5,653,266 | 8/1997 | Reynolds et al. | 138/137 |

FOREIGN PATENT DOCUMENTS

0551094A1   5/1993   European Pat. Off. .......... B32B 7/04

OTHER PUBLICATIONS

Acton Technologies, Inc., Technology for Tomorrow, 1989.
Printed Circuit Fabrication, vol. 13, No. 1, Jan. 1990, Evaluation of Fluorocarbon Etchants by Carl Brogado.
The Etching of Fluoropolymers in Preparation for Bonding and Metallization, Apr. 26–29, 1992, James A. Rusnock.

*Primary Examiner*—Andres Kashnikow
*Assistant Examiner*—Davis D. Hurn
*Attorney, Agent, or Firm*—Synnestvedt & Lechner LLP

[57] ABSTRACT

An improved conduit for transporting fuel and/or fuel vapor or a motion transmitting member in an automobile comprising an inner tube comprised of fluorocarbon polymeric material and having an inner surface for contacting and containing fluids or a motion transmitting member, and a chemically etched outer surface having a substantial portion of the fluorine of the fluorocarbon polymer substituted by a polar moiety. The conduit further includes an outer tube comprising an inner surface comprised of polymeric material containing sufficient polar groups such that hydrogen bonding at the interface between the outer surface of the inner tube and the inner surface of the outer tube prevents substantial relative separation of or movement between the inner and outer tubes.

23 Claims, 1 Drawing Sheet

CHEMICALLY BONDED MULTI-WALL CONDUIT

CROSS REFERENCE TO RELATED APPLICATION

This application is a continuation of co-pending U.S. application Ser. No. 08/321,220, filed on Oct. 11, 1994, now U.S. Pat. No. 5,653,266.

BACKGROUND OF THE INVENTION

This invention is directed to conduits, and more particularly to conduits which have exceptional mechanical integrity and which are adaptable for use in carrying fluids or motion transmitting members.

Conduits for transporting fuel and/or fuel vapors to and from the engines of cars, buses, boats, airplanes and the like are important components of the fuel delivery systems of such vehicles. These conduits must possess a variety of characteristics and features, not the least of which are resistance to vapor permeability and chemical degradation. The need for these features has recently become acute due to increasingly stringent environmental regulations and to the increased emphasis on the development and use of oxygen containing compounds in fuels and fuel additives. Many of these compounds tend to severely degrade the materials heretofore used in fuel system conduits.

One material which possesses exceptional resistance to chemical degradation and vapor permeation is polytetrafluoroethylene (PTFE). Accordingly, such materials are desirable for use as liners in conduits used in fuel delivery systems. However, PTFE and like materials also frequently possess characteristics which make their use in such conduits difficult. For example, fluorocarbon polymers are well known for their "slipperiness," which sometimes makes the construction of a mechanically stable conduit difficult, thereby limiting their application.

U.S. Pat. No. 3,050,786—St. John, et al. relates to conduits lined with PTFE. While this patent recognizes the advantageous features of such fluorocarbon polymers, it also recognizes their deficiencies:

Although (PTFE) has considerable toughness and can withstand temperatures in normal usage upwards of 200° F., it is still a plastic without mechanical strength available in metals or other non-plastic materials. In view of the above, a need has developed for a satisfactory method of combining (PTFE) with another material having the necessary mechanical strength.

Thus, there has been a long felt need for conduits which incorporate a mechanically stable fluorocarbon inner liner or coating. As explained in the patent to St. John, et al.:

If one were seeking a pipe, for example, having the strength of steel and the chemical inertness of PTFE, the obvious solution would appear to be to line a steel pipe with the resin. Unfortunately, this is more easily said than done. A lining in order to be acceptable must be provided in such a manner that separation from the pipe wall is precluded during the anticipated life of the pipe. As a lining, the material must have sufficient thickness so as to render it impermeable. Considerable difficulty has been encountered in attempting to employ dispersions of PTFE for coating the interior of a pipe. Multiple coats must be applied in order to build up sufficient wall thickness. At the same time, however, a satisfactory method has not been found for perfecting a bond between such a coating and other materials. The alternative method of forcing an outsized liner into a pipe bore cannot be utilized for lengths in excess of a few inches.

The patent to St. John, et al. attempts to overcome the above-noted difficulties by providing a tube of prestressed, sintered PTFE resin which is dimensionally stable at room temperature but which alters its girth upon heating. In this way, the PTFE tube can be inserted into the outer sheath of the conduit and then heated so as to expand into tight conformity therewith.

While the solution presented by St. John, et al. may prove advantageous in certain applications, applicants have found that such techniques can also have disadvantages. For example, the outer casing to which the PTFE is joined may not itself possess thermal stability at the temperatures required to expand and/or shrink the PTFE resin into conformity therewith. Additionally and importantly, applicants have found that tubular PTFE products, especially thin walled tubular PTFE products, are highly susceptible to kinking and deformation during processing thereof. Such kinking and/or deformation is highly detrimental since it tends to substantially reduce the resistance of the PTFE material to vapor permeation. For this additional reason, therefore, methods of the type disclosed by the St. John et al. patent may be unacceptable due to deformation or kinking the PTFE liner.

Applicants have discovered that it is possible to form a strong, mechanically stable, and highly vapor permeation resistant tubular composite comprising an outer plastic jacket and an inner PTFE liner without the use of either adhesive bonding or macroscopic mechanical joining techniques. The prior art has recognized the extreme difficulty associated with joining fluoropolymer articles to other materials, even if adhesive bonding is involved. See, for example, U.S. Pat. No. 4,744,857—Nelson, wherein it is noted that numerous difficulties are associated with the use of chemical etching techniques to aid in adhesive bonding of fluorocarbon polymers.

The process of chemical etching typically includes introducing the surface material to be treated into a powerful etchant, such as a treatment solution of an alkali metal in an amine-type solvent (including liquid ammonia). Such a process, which is disclosed in U.S. Pat. No. 2,789,063—Purvis, et al, is known to be an extremely harsh procedure, and the disadvantages of this approach are that the surface degrades easily and there are waste disposal and pollution problems. Another basic disadvantage of this method is in the inconvenience, difficulty and hazard of handling a solvent such as liquid ammonia. Moreover, these techniques are known to not be applicable to all types and formulations of fluorocarbon polymer articles. Because of all these difficulties and for other reasons, tubular composites formed from adhesive-free, chemically etched fluorocarbon polymer liner have not to applicants knowledge been heretofore formed.

Accordingly, it is an object of the present invention to provide conduits having mechanical integrity and resistance to chemical degradation.

It is also an object of this invention to provide fuel system conduits having both mechanical integrity and resistance to vapor permeation.

It is a further object of the present invention to provide fuel system conduits and wire carrying conduits having liners comprising fluorocarbon polymer.

It is yet another object of the present invention to provide methods for forming tubular conduits in which the inner plastic liner thereof is not subject to deleterious kinking or deformation during the manufacture thereof.

It is an even further object of the present invention to provide a harmless, satisfactory method for perfecting a bond between a fluorocarbon polymer liner and a polymeric jacket.

SUMMARY OF THE INVENTION

Applicants have found that these and other objects are satisfied by conduits constructed according to the present invention. In particular, applicants have found that advantageous characteristics and features are present in automotive fuel and wire carrying conduits which comprise an inner tube comprised of a chemically etched fluorocarbon polymeric outer surface, and a coaxial, polymeric outer tube bonded thereto.

According to preferred embodiments, the inner tube is comprised of a fluorocarbon polymeric material and has an inner surface for contacting and containing fluids or a motion transmitting member. Conduits of the type having means for transmitting motion therethrough are well known in the art, for example, as described in U.S. Pat. Nos. 5,243,876 and 4,362,069, which are assigned to the assignee of the present invention and incorporated herein by reference, as if fully set forth below.

Importantly and critically, the inner tube further comprises a chemically etched outer surface having a substantial portion of the fluorine of the fluorocarbon polymer substituted by a polar moiety. The outer tube preferably comprises an inner surface comprised of polymeric material containing sufficient polar groups such that hydrogen bonding at the interface between the outer surface of the inner tube and the inner surface of the outer tube prevents substantial relative separation of or movement between the inner and outer tubes.

According to especially preferred embodiments, the fluorocarbon polymeric material of the inner tube comprises PTFE, and the polymeric material of the outer tube comprises thermoplastic polymer, and even more particularly polyamide. For example, in certain embodiments the conduits comprise a PTFE inner tube and a nylon outer tube substantially surrounding the inner tube. According to particularly preferred embodiments, the PTFE inner tube is comprised of an inner semiconductive layer and an optionally coextruded outer layer which is chemically etched on its surface prior to the application of the nylon outer tube.

The tubular conduits of the present invention are preferably, although not necessarily, formed according to the 5 methods hereof. In particular, the present methods preferably comprise providing a first tubular product of fluorocarbon polymeric material having a semiconductive inner layer and a chemically etched outer layer, and melt extruding over said first tubular product a second polymeric tubular product containing sufficient polar groups such that hydrogen bonding between the inner and outer tubes causes the tubes to be chemically bonded. In this way, substantial relative movement between the tubes is prevented without the use of an adhesive layer.

DETAILED DESCRIPTION OF PREFERRED EMBODIMENTS

I. THE FUEL SYSTEM CONDUITS

Figure 1:
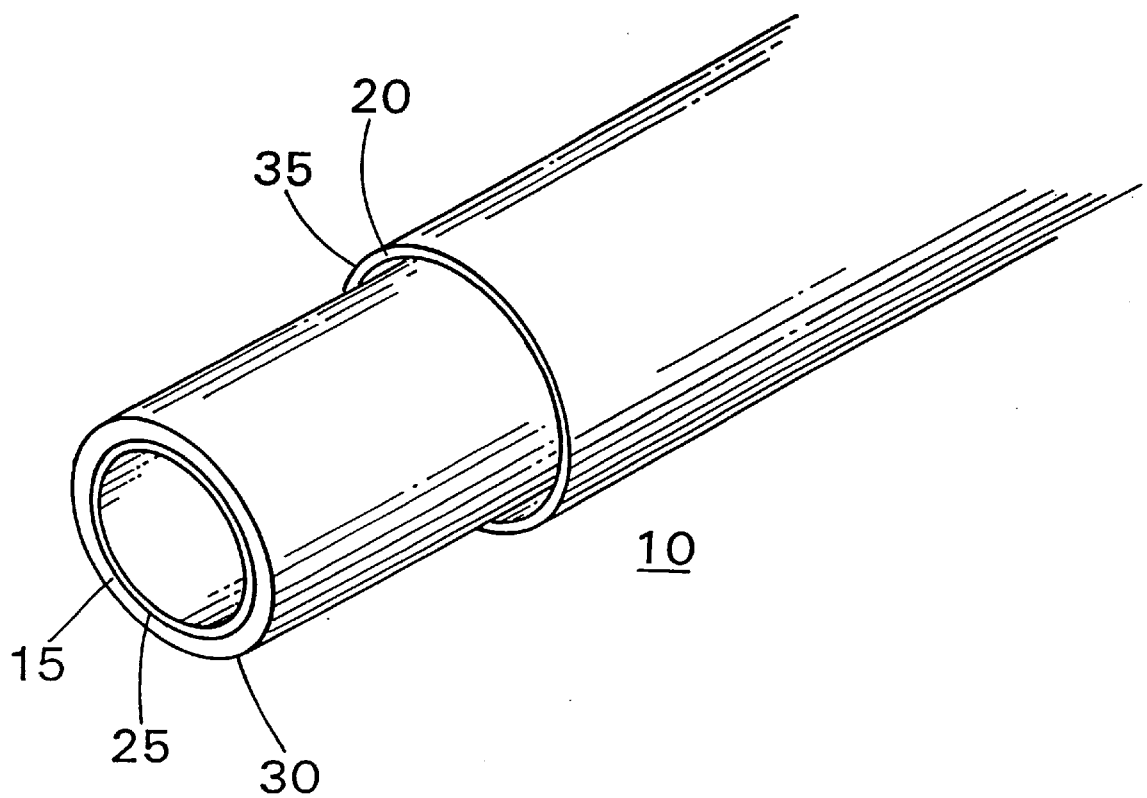
FIG. 1 is a partially broken-away perspective view of a fuel line according to one embodiment of the present invention.

The improved fuel system conduit of this invention comprises an inner tube. As will be appreciated by those skilled in the art, the inner tube of the present invention will contain and be in contact with fuel and/or fuel vapor. As a result, the inner tube or liner portions of the present conduits should not only possess flexibility and thermal and chemical stability, but also a high degree of resistance to liquid and vapor permeability. It is generally preferred that the inner tube or liner comprise a product formed from a resin of fluorocarbon polymer. As is well known, fluorocarbon polymers are a class of paraffinic polymers which have some or all of the hydrogen replaced by fluorine. The inner tubes of the present invention are preferably formed from materials comprising fluorocarbon resin selected from group comprised of polytetrafluoroethylene (PTFE), fluorinated ethylene propylene copolymer (FEP), perfluoroalkoxy (PFA) resin, polychlorotrifluoroethylene (PCTFE), ethylenetrichlorotrifluoroethylene copolymer (ECTFE), ethylenetetrafluoroethylene copolymer (ETFE), polyvinylidene fluoride (PVDF), polyvinyl fluoride (PVF), and mixtures of one or more of these. While it is contemplated that all of the above fluorocarbon polymers, including homopolymers, copolymers, block and graft copolymers of any of the above, may be used, PTFE resin is preferred.

According to preferred constructions, the inner tube is a thin-walled composite tube comprised of an outer portion formed of PTFE resin and an inner portion formed of a mixture of PTFE and semiconductive carbon. This PTFE inner tube is relatively tough, while having a wall thickness of only about 0.20 to about 0.50 mm., and preferably about 0.38 mm.

The present conduits also comprise a coaxial outer tube. In general, the outer tube preferably contributes to the strength and mechanical stability to the conduit. While many materials are believed to be adaptable for use in forming the outer tube hereof, it is preferred according to certain embodiments that the outer tube comprise a thermoplastic resin. Similarly, although many thermoplastic resins are adaptable for use according to the present invention, it is presently contemplated that polyamide resins will provide especially beneficial results.

According to important and critical aspects of the present invention, the fuel conduits include an inner tube of fluorocarbon polymeric material having a chemically etched outer surface. According to preferred embodiments, this chemically etched surface is characterized by a substantial portion of the fluorine atoms on the outer surface layer of the inner tube being substituted by a polar moiety. Furthermore, the inner surface of the outer tube contains sufficient polar groups such that hydrogen bonding between the inner and outer tubes prevents substantial relative movement between the tubes. Preferably about 65 to about 95 percent of the fluorine atoms are removed from the molecules at the outer surface of the inner tube. As the term is used herein, "outer surface layer of the inner tube" means the layer of the tube extending about 200 Angstroms from the outer surface into the tube wall. In especially preferred embodiments, substantially all fluorine atoms, about 80 to about 95 percent, are removed from the molecules in the outer surface layer of the inner tube and replaced by one or more polar groups. It is further preferred that no fluorine atoms are removed below the outer surface layer of the inner tube.

As will be appreciated, the conduits of the present invention are especially well adapted to prevent or at least inhibit relative rotation between the inner and the outer tubes, as well as relative longitudinal movement between the inner and the outer tubes. The composite conduits of this invention utilize a highly effective associative bond between the PTFE thin-walled inner tube and the plastic outer tube, thereby resulting in extraordinarily high shear strength between the tubes. The resulting associative bond preferably demonstrates a shear strength of at least about 150 psi and, even more preferably, at least about 200 psi. It will be appreciated that the degree of shear strength, or the force necessary to separate the tubes, according to this embodiment of the invention will depend, at least in part, upon the degree of fluorine removal from the outer surface of the inner tube, as well as the quantity of polar groups comprised in the thermoplastic polymeric outer tube.

Figure 2:
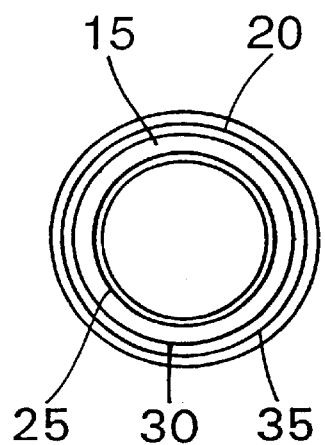
FIG. 2 is a section view of the fuel line of FIG. 1.

A preferred embodiment of the present invention will now be described with reference to the FIGS. 1 and 2. In particular, FIGS. 1 and 2 illustrate an improved fuel system conduit, designated generally as 10, in perspective and section views. Conduit 10 preferably comprises PTFE inner tube 15 and coaxial polyamide outer tube 20.

The interior surface of the inner tube 25 preferably comprises an inner layer of semiconductive carbon. The semiconductive carbon layer 25 functions as a static charge drain and prevents the creation of potentially hazardous electrical sparks within the line. The outer layer 30, before chemical etching, has a plurality of fluorine atoms on a polymer "backbone." When chemically etched, the fluorine atoms are preferably substituted by a plurality of hydroxyl or other polar groups.

The outer tube 20 covers, and preferably substantially surrounds, inner tube 15 and necessarily has a plurality of polar groups on the inner surface 35 thereof which bond with polar groups on the outer surface 30 of inner tube 15. The outer tubing or jacket materials preferably contain the hydrogen-bonding groups needed to interact and bond with the etched surface containing hydroxyl groups. Suitable jacket materials include polyamides, polyurethanes, polyesters, and natural and synthetic rubbers and the like. The bonding at the interface between the etched outer surface 30 of the inner tube 15 and the polar inner surface 35 of the outer tube 20 prevents or substantially inhibits the inner tube 15 from rotating relative to, or separating from, the outer tube 20.

Applicants have thus found a composite inner/outer tube combination in which the beneficial toughness and mechanical strength of the outer tube is effectively transferred to the inner tube. Although applicants do not intend to be bound by or limited to any particular theory of operation, it is believed that the intimate chemical integration provided by the present invention results in an inner tube which is much less susceptible to the drawbacks heretofore exhibited by, for example, PTFE liners for fuel system conduits. That is, a relatively thin PTFE liner is effectively imparted with the physical ruggedness of the thermoplastic outer tubing. When the conduit is twisted or turned, for example, the PTFE tube has a much reduced tendency to kink or crack. Further, applicants have found a harmless, satisfactory method for perfecting a bond between such a fluorocarbon polymer liner and the material of the conduit wall, whereby separation from the conduit wall is precluded during the anticipated life of the conduit.

II. THE METHODS

A preferred method for making the fuel system conduits of the present invention is now described. For the purposes of illustration, the methods will be described in connection with the production of tubular conduits comprising a inner tube comprised of PTFE and an outer tube comprised of polyamide.

The fuel conduit is preferably manufactured by providing an inner tube comprising a fluorocarbon polymer outer layer. The inner tube is preferably provided by forming a paste extruded PTFE tubular product using any one of a variety of applicable fabricating methods, including various extruding techniques known in the art. For example, powdered PTFE polymer may be compressed into a cylindrical preform. For embodiments in which a semiconductive carbon inner layer is required, the center of the preform may be comprised of semiconductive carbon powders. The PTFE preform is then extruded in a typical and known fashion. The tube may then be further processed, such as by sintering, in known fashion.

The methods also comprise the step of exposing at least the outer surface of the inner tube to a chemical etchant. Chemical etching of a fluoropolymer comprises a chemical reaction between an alkali metal with fluorine in the polymer. By immersing the PTFE tube in a chemical etchant solution, the metal in the chemical etchant reacts with the fluoropolymer surface by extracting a substantial portion of the fluorine atoms on the outer surface of the tube, the fluorine atoms being replaced by a polar moiety. According to preferred embodiments, the chemical etchant comprises sodium/naphthalene in a dialkyl glycol ether solvent. Such etchants are safer than, yet just as effective as, sodium/liquid ammonia etchants which are dangerous and difficult to handle. The etchants are more user-friendly in that they demonstrate lower combustibility and toxicity, will not ignite upon exposure to moisture, and do not require fume hoods or other special equipment during use.

The methods preferably comprise maintaining the chemical etchant at a temperature between about 120 F. and about 145° F. It is contemplated that warming the tubing to about the same temperature as the etchant yields even more favorable results. The PTFE tube is then completely immersed in the etchant. This is preferably done continuously by passing the PTFE tube through a tubular reactor containing the heated chemical etchant. The PTFE tube is preferably passed through the etchant-filled reactor at a speed which allows the etching solution to contact the PTFE tube for about 5 to about 20 seconds. This contact time permits removal of fluorine atoms from the outer surface layer of the tube only, or to a depth of about 200 Angstroms.

Applicants have discovered that the present methods produce the unexpected and desirable result of being relatively selective with respect to the depth of etch. More specifically, applicants have found that the present methods effect removal of fluorine atoms to a depth of about 200 Angstroms, but that further significant penetration of the etchant and removal of fluorine atoms does not occur, even with extended exposure to the etchant solution. Further, it has been found that no distinguishing bond or shear strength results from contact times in excess of the above stated range. In other words, a PTFE tube immersed for a contact time of greater than about 20 seconds will not provide any meaningful improvement in shear strength.

After removing the inner tube from the etchant, it is preferably then placed in an alcohol or acetone bath for about 3 to about 10 seconds, in order to substantially remove any sodium and excess naphthalene. The inner tube is then washed with water, preferably water heated to a temperature of about 150–180° F., and allowed to air dry.

The methods further preferably include extruding a polymeric outer tube, and preferably a thermoplastic resin outer tube, over the chemically etched inner tube. Extrusion of the thermoplastic resin preferably occurs in a melt process during which the resin is in a relatively fluid, mobile state. While it is contemplated that no heat is necessary to bond the polyamide outer tube with the PTFE inner tube, it is preferred that the chemically etched PTFE substrate be heated for a short period of time before melt extruding the outer tube. The PTFE inner tube is preferably heated for only a few seconds, for example, by running it through a gas flame, to bring it to a temperature of about 100–200° F.

Finally, upon preferable subsequent processing, the material of the outer tube crystallizes and/or hardens in and around the inner tube, thereby forming an outer tube surrounding and coaxial with the inner tube. The polar materials of the thermoplastic outer tube interact with the polar moiety on the etched surface of the PTFE inner tube, whereby hydrogen bonding at the interface results in strong shear strengths without the use or need for adhesives.

What is claimed is:

1. An improved fuel system conduit for transporting fuel and/or fuel vapor in an automobile comprising:
   (a) an inner tube comprising fluorocarbon polymeric material and having (i) an inner surface for contacting and containing the fuel and/or fuel vapor, said inner surface comprising a mixture of fluorocarbon polymeric material and semiconductive carbon; and (ii) a chemically etched outer surface having a substantial portion of the fluorine of said fluorocarbon polymer substituted by a polar moiety; and
   (b) an outer tube surrounding and coaxial with said inner tube, at least the inner surface of said outer tube comprising polymeric material containing sufficient polar groups such that hydrogen bonding at the interface between the outer surface of said inner tube and the inner surface of said outer tube prevents substantial relative movement between said inner and outer tubes.

2. The improved conduit according to claim 1 wherein said fluorocarbon polymeric material comprises PTFE.

3. The improved conduit of claim 2 wherein said conduit is a vapor return line.

4. The improved conduit of claim 1 wherein said inner surface of said outer tube comprises thermoplastic polymeric material.

5. The improved conduit of claim 4 wherein said thermoplastic polymeric material comprises polyamide.

6. The improved conduit of claim 1 wherein said inner surface of said outer tube comprises rubber.

7. The improved conduit of claim 1 wherein said inner surface of said outer tube comprises polymeric material containing sufficient polar groups such that hydrogen bonding between said inner and outer tubes causes said conduit to have a shear strength of at least about 150 psi.

8. The improved conduit of claim 7 wherein said hydrogen bonding between said inner and outer tubes causes said conduit to have a shear strength of at least about 200 psi.

9. The improved conduit of claim 1 wherein said chemically etched outer surface is no greater than about 200 Angstroms thick.

10. The conduit of claim 1 wherein said inner tube has an inner diameter of from about 6.3 mm to about 25.4 mm.

11. The conduit of claim 1 wherein said inner tube has a solid wall thickness of from about 0.20 mm. to about 0.50 mm.

12. The conduit of claim 1 wherein said inner tube has a solid wall thickness of from about 0.30 mm. to about 0.40 mm.

13. The conduit of claim 1, wherein said inner and outer surfaces of said inner tube are coextruded.

14. An improved motion transmitting conduit comprising:
   (a) an inner tube comprising fluorocarbon polymeric material and having (i) an inner surface for contacting the motion transmitting means, and (ii) a chemically etched outer surface having a substantial portion of the fluorine of said fluorocarbon polymer substituted by a polar moiety; and
   (b) an outer tube surrounding and coaxial with said inner tube, at least the inner surface of said outer tube comprising polymeric material containing sufficient polar groups such that hydrogen bonding at the interface between the outer surface of said inner tube and the inner surface of said outer tube prevents substantial relative movement between said inner and outer tubes.

15. A method of producing an improved fuel system conduit comprising the steps of:
   (a) providing an inner tube comprising fluorocarbon polymeric material on the outer surface thereof;
   (b) providing a chemical etchant at a temperature of from about 120° F. to about 145° F.;
   (c) immersing the outer surface of said inner tube in said chemical etchant under conditions effective to replace a substantial portion of the fluorine atoms on the outer surface of said inner tube with a polar moiety;
   (d) removing excess etchant from said tube; and
   (e) extruding a polymeric material over said inner tube to produce an outer tube surrounding and coaxial with said inner tube, at least the inner surface of said outer tube containing sufficient polar groups such that hydrogen bonding at the interface between the outer surface of said inner tube and the inner surface of said outer tube prevents substantial relative movement between said inner and outer tubes.

16. The method of claim 15, wherein said inner tube comprises PTFE.

17. The method of claim 15 wherein said extruded polymeric material comprises thermoplastic polymer.

18. The method of claim 17 wherein said thermoplastic polymer comprises polyamide.

19. The method of claim 15 wherein said extruded polymeric material comprises rubber.

20. The method of claim 15 wherein said chemical etchant comprises sodium/naphthalene in glycol ether solvent.

21. The method of claim 17 wherein said thermoplastic polymer is melt extruded at an elevated temperature over a warmed fluorocarbon polymer substrate.

22. The method of claim 21 wherein said fluorocarbon polymer substrate is PTFE.

23. The method of claim 21 wherein said substrate is warmed to a temperature of about 100° F. to about 200° F., and wherein said thermoplastic is melt extruded at a temperature of from about 425° F. to about 475° F.

* * * * *